(12) United States Patent
Farmer et al.

(10) Patent No.: US 8,561,442 B2
(45) Date of Patent: Oct. 22, 2013

(54) STEERING SHAFT LOCK ACTUATOR

(75) Inventors: William Farmer, Westford, MA (US); Sumit Sharma, Brookline, MA (US); William Fort, Stratham, NH (US); Brian Ganter, Foxborough, MA (US); Todd Meaney, San Luis Obispo, CA (US)

(73) Assignee: Stoneridge Control Devices, Inc., Canton, MA (US)

( * ) Notice: Subject to any disclaimer, the term of this patent is extended or adjusted under 35 U.S.C. 154(b) by 8 days.

(21) Appl. No.: 13/286,958

(22) Filed: Nov. 1, 2011

(65) Prior Publication Data

US 2012/0048053 A1    Mar. 1, 2012

Related U.S. Application Data

(62) Division of application No. 11/223,435, filed on Sep. 9, 2005, now Pat. No. 8,047,028.

(60) Provisional application No. 60/608,261, filed on Sep. 9, 2004.

(51) Int. Cl.
*B60R 25/02* (2013.01)

(52) U.S. Cl.
USPC .................................... 70/186; 292/144

(58) Field of Classification Search
USPC ............... 292/144; 70/182–186, 252
See application file for complete search history.

(56) References Cited

U.S. PATENT DOCUMENTS 6,006,851 A * 12/1999 Brown ......................... 180/287
7,021,093 B2    4/2006 Fukatsu et al.
7,140,213 B2    11/2006 Feucht et al.
2001/0025516 A1    10/2001 Starken
2002/0088257 A1    7/2002 Dimig et al.
2004/0031299 A1 *   2/2004 Dimig et al. ................... 70/186
2004/0069026 A1    4/2004 Fukushima
2004/0069027 A1    4/2004 Fukushima
2004/0074266 A1    4/2004 Zillmann
2005/0260677 A1    11/2005 Saaski

FOREIGN PATENT DOCUMENTS

| EP | 0764565  | 3/1997 |
| EP | 1380480  | 1/2004 |
| WO | 0107301  | 2/2001 |
| WO | 03042014 | 5/2003 |

OTHER PUBLICATIONS

European Search Report dated Oct. 5, 2009 issued in related European Patent Application No. 05795134.5.
International Search Report with Written Opinion dated Oct. 10, 2006 received in corresponding International Patent Application Serial No. PCT/US05/32465.

* cited by examiner

*Primary Examiner* — Kristina Fulton
(74) *Attorney, Agent, or Firm* — Grossman, Tucker, Perreault & Pfleger, PLLC (57) ABSTRACT

A steering shaft lock actuator may include a motor having an output shaft, a drive train, and a lost motion device. The drive train may be coupled to the output shaft and may linearly urge a locking member to an unlocked position when the motor is energized. The lost motion device may be configured to store energy when the locking member is in the unlocked position and utilize the stored energy to drive the locking member toward a locked position with a steering shaft when the motor is de-energized.

7 Claims, 7 Drawing Sheets

FIG. 2

FIG. 4C
LOCKED POSITION
LOCKING MEMBER EXTENDED

FIG. 5B
LOCKED POSITION
LOCKING MEMBER EXTENDED

FIG. 5A
UNLOCKED POSITION
LOCKING MEMBER RETRACTED

FIG. 6

# STEERING SHAFT LOCK ACTUATOR

CROSS REFERENCE TO RELATED APPLICATIONS

This application is a divisional of U.S. patent application Ser. No. 11/223,435, filed Sep. 9, 2005, which claims the benefit of the filing date of U.S. Provisional Application Ser. No. 60/608,261, filed Sep. 9, 2004, the entire teachings of which are incorporated herein by reference.

TECHNICAL FIELD

This disclosure relates to steering shaft lock actuators.

BACKGROUND

In the automotive industry, it is desirable to lock the steering shaft of a vehicle in place to prevent rotation of the steering shaft when the vehicle is not in use. Known systems utilize a keyed ignition system associated with the steering column. When the key is removed from the ignition, a steering shaft lock mechanism may be actuated to lock the steering shaft in place. Other vehicles utilize a keyless system or a system where the keyed ignition system is not associated with steering column. For these configurations, a separate actuator may be used to lock and unlock the steering shaft.

In one known steering shaft lock actuator, a locking member may be moved by the actuator from an unlocked to a locked position. When in the locked position, the locking member may engage a recess in the steering shaft to lock the steering shaft. The recess may be formed by adjacent teeth of a toothed ring that may be coupled to the steering shaft. An obstruction, e.g., a tooth of the toothed ring, may be encountered as the actuator attempts to drive the locking member to the locked position. The actuator motor may remain energized so that the motor drives the locking member to the locked position when the obstruction is removed. This can stress the motor and lead to early failure of the actuator. Actuator failure may be manifested in a failure of to lock the steering shaft when the vehicle is not in use and/or inadvertent locking of the steering shaft during normal driving conditions, which, of course, would pose a critical safety hazard.

Accordingly, there is a need in the art for a steering shaft lock actuator configured to protect the actuator if an obstruction is encountered when the actuator attempts to drive the locking member toward a locked position and there is a need for a reliable steering shaft lock actuator to protect against inadvertent locking of the steering shaft during normal driving conditions.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

The description provided herein is with reference to various exemplary embodiments. It is to be understood that the embodiments described herein are presented by way of illustration, not of limitation. The present invention may be incorporated into a wide variety of systems without departing from the spirit and scope of the invention.

Figure 1A:
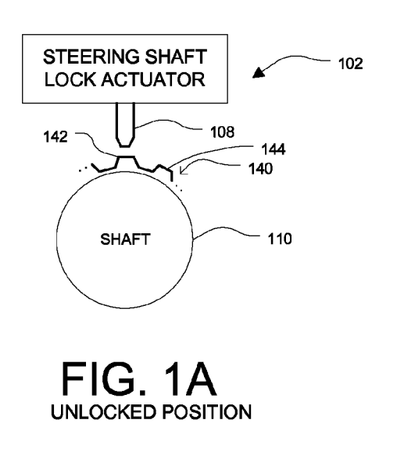
FIG. 1A is a block diagram of a steering shaft lock actuator in an unlocked position with its locking member retracted.
Figure 1B:
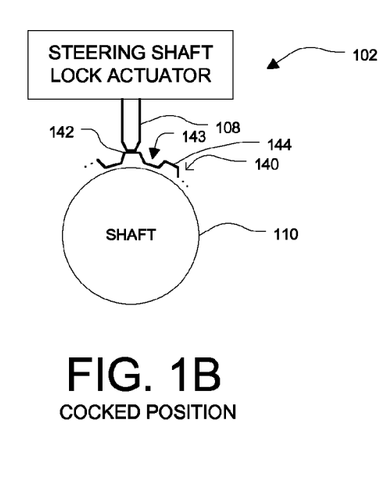
FIG. 1B is a block diagram of the steering shaft lock actuator in a cocked position.
Figure 1C:
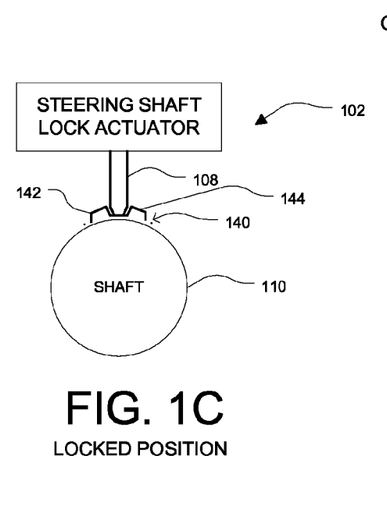
FIG. 1C is a block diagram of the steering shaft lock actuator in a locked position with its locking member fully extended once the obstruction of FIG. 1B is removed.

Turning now to FIGS. 1A-1C, there is shown in block diagram form an exemplary steering shaft lock actuator 102 consistent with the invention in an unlocked position (FIG. 1A), a cocked position (FIG. 1B), and a locked position (FIG. 1C.) The steering shaft actuator 102 may include a locking member 108 coupled to a motor through a gear train for extending and retracting the locking member to lock and unlock a steering shaft 110. A toothed ring 140 may be affixed to the shaft about the circumference of the shaft. For clarity of illustration, only a portion of the toothed ring 140 having teeth 142 and 140 is illustrated.

FIG. 1A illustrates the steering shaft lock actuator 102 in an unlocked position with the locking member retracted away from the toothed ring 140. In the unlocked position, the steering shaft 110 is free to rotate, unencumbered by the locking member 108. FIG. 1B illustrates the steering lock actuator 102 in a cocked position wherein the locking member 108 is extended toward the toothed ring but has been blocked from entering a recess 143 between adjacent teeth by an obstruction. In one example, the obstruction may occur when the locking member 108 and the teeth of the toothed ring 140 are not properly aligned so that the locking member 108 contacts one of the teeth, e.g., tooth 142, as it attempts to extend into the recess 143.

Advantageously, the steering lock actuator 102 may include a lost motion device, e.g., a compression spring in one embodiment, having sufficient stored energy in the cocked position to drive the locking member 108 once the obstruction is removed. Thus, the actuator and a motor therein may be de-energized when the locking member 108 is in the cocked position. For instance, as the steering shaft 110 is rotated counterclockwise from its position illustrated in FIG. 1B to its position illustrated in FIG. 1C, the lost motion device may force the locking member 108 to fully extend to a locked position into the recess 143 between teeth 142 and 144 of the toothed ring 140.

Figure 2:
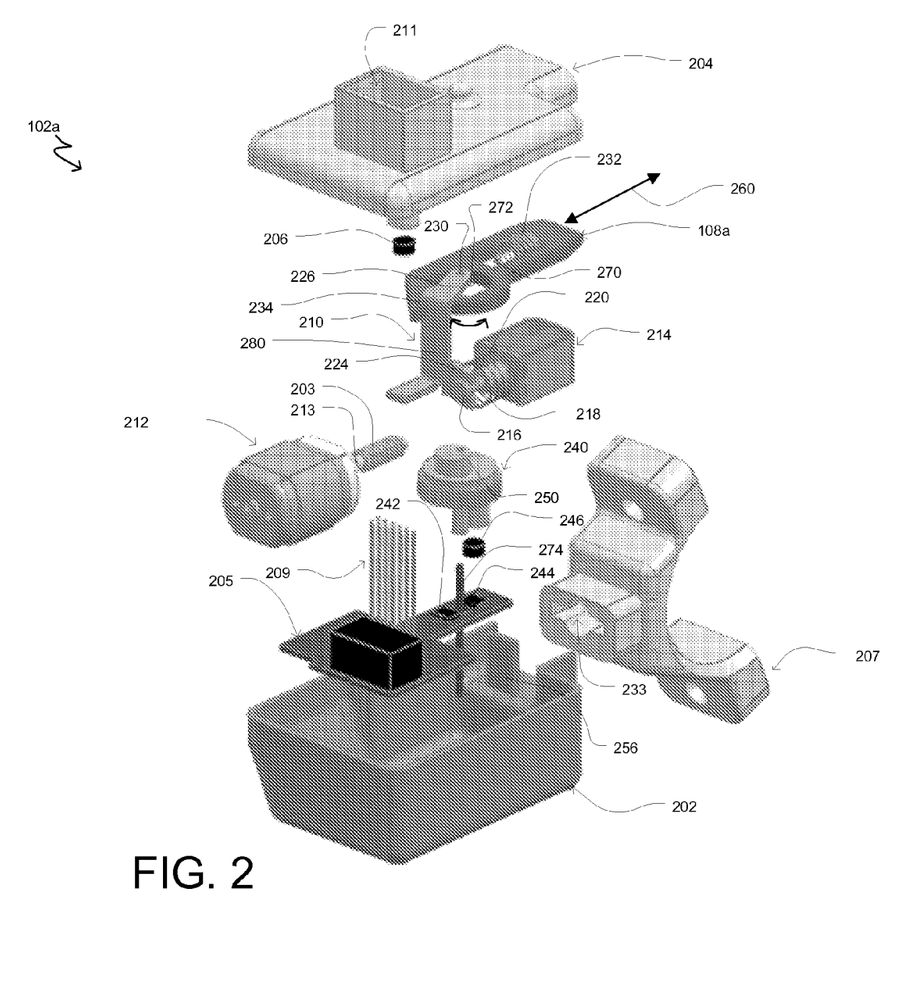
FIG. 2 diagrammatically illustrates a first embodiment of a steering shaft lock actuator consistent with the present invention.

FIG. 2 diagrammatically illustrates one exemplary embodiment 102a of a steering shaft lock actuator consistent with the present invention. The steering shaft lock actuator 102a may be configured to urge the locking member 108a linearly in the directions indicated by arrows 260 to unlocked, cocked, and locked positions, e.g. as illustrated in FIGS. 1A-1C. The steering shaft actuator 102a may include a housing 202 configured to mate with a cover 204 to protect components of the actuator 102a. A collar 207 may be affixed to the housing 202 and may be affixed proximate a steering shaft. The collar 207 may have an opening 233 to permit linear travel of the locking member 108a therethrough.

The steering shaft lock actuator 102a may further include a motor 212 having an output shaft 213, a drive train coupled to the output shaft, and a lost motion device, e.g. a compression spring 232. The drive train coupled to the output shaft 213 may include a worm gear 203 and a worm wheel 240 including an eccentric cam 250. The steering shaft lock actuator 102a may further include the locking member 108a, a locking lever 210, a solenoid 214, a printed circuit board (PCB) assembly 205, magnets 246 and 206, and position sensors 242, 244. The locking member 108a may have a first opening 270 and a second opening 272. The motor 212 may be a permanent magnet DC motor. The PCB assembly 205 may include a plurality of contacts 209 that extend into an opening 211 of the cover 204 to form a plug connection for an associated plug. The plug connection may provide connection to a power source and a central controller of the vehicle.

In general, the rotary motion provided by the motor 212 may provide linear motion to the locking member 108a to linearly drive the locking member in the direction of arrows 260. A drive gear, e.g., the worm wheel 240 having the eccentric cam 250, may linearly urge the locking member 108a to the desired locked or unlocked position. The compression spring 232 may be positioned to bias the locking member 108a toward a fully extended or locked position. The compression spring 232 may have one end positioned against a tab 256 of the housing 202 and an opposite end positioned against an edge 271 of the first opening 270 of the locking member 108a (see also FIG. 3). The position of the locking lever 210 and also the eccentric cam 250 may prevent extension of the locking member 108a under the bias of the compression spring 232. The locking lever 210 may therefore provide a safety feature to prevent an inadvertent extension of the locking member 108a.

The locking lever 210 may include a longitudinal extension 280, a locking arm 226 extending from one end of the longitudinal extension 280, and a projection 224 extending from the other end of the longitudinal extension 280. The locking arm 226 may have an opening 230 to accept a shaft 274. The projection 224 of the locking lever 210 may have an opening configured to mate with a plunger 218 of the solenoid 214. The locking lever 210 may have a locked an unlocked position. When in the locked position, the locking lever 210 may prevent axial extension of the locking member 108a to an extended or locked position. When in the unlocked position, the locking lever 210 may enable the locking member 108a to extend to a locked position.

Figure 3:
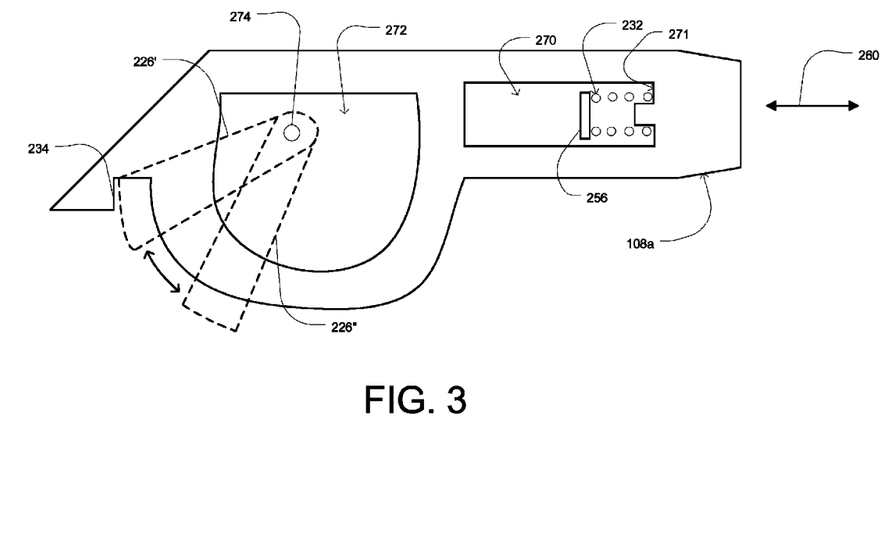
FIG. 3 is plan view of the locking member and locking arm of FIG. 2.

FIG. 3 is a plan view of the locking arm 226 of the locking lever 210 with the locking arm 226 shown in phantom in a locked position 226' and unlocked position 226". To drive the locking arm 226 to its locked position 226', the solenoid 226 may be de-energized. When the solenoid is de-energized, the compression spring 220 about the plunger 218 of the solenoid 214 may urge the projection 224 of the locking lever 210 away from the solenoid so that a portion of the locking lever 210 is urged into a slot 234 of the locking member 108a. The portion of the locking lever 210 urged into a slot 234 may be the longitudinal extension 280 of the locking lever 210. When in a locked position, as illustrated in FIG. 2 and the position 226' of FIG. 3, the locking member 108a may be prevented from linearly extending toward its locked position.

To drive the locking arm 226 to its unlocked position 226", the solenoid may be energized to pull the plunger 218 against the biasing force of the compression spring 220. The plunger 218 may include a lip 216 that pulls the projection 224 of the locking lever 210 and hence the locking arm 226 may be rotated counterclockwise to its unlocked position 226". When in the unlocked position 226", the locking lever 210 is no longer in the notch 234 and may allow linear extension of the locking member 108a toward its locked position.

Figure 4A:
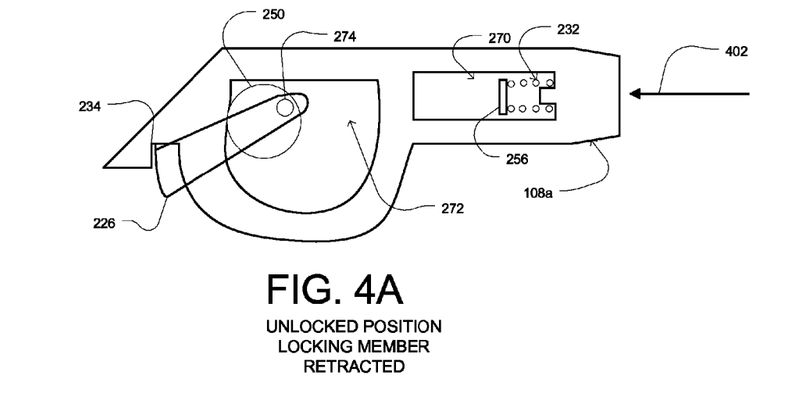
FIG. 4A is a plan view of the locking member and eccentric cam of FIG. 2 in an unlocked position with the locking member retracted.
Figure 4B:
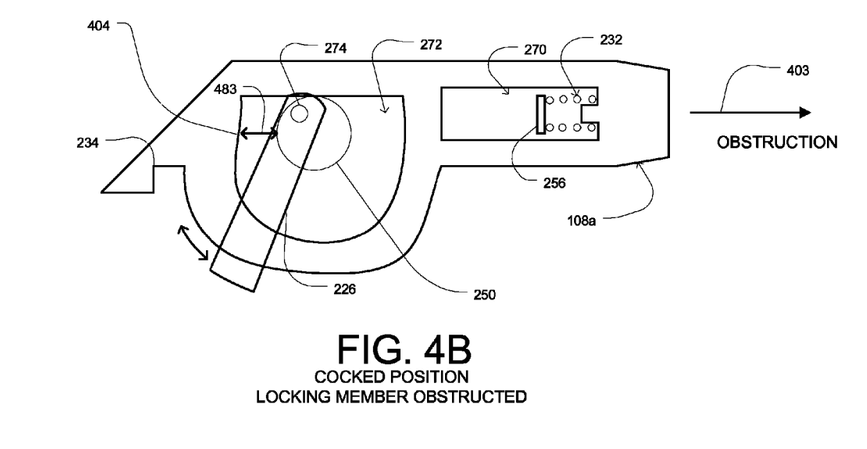
FIG. 4B is a plan view of the locking member and eccentric cam of FIG. 2 in a cocked position with the locking member blocked by an obstruction.
Figure 4C:
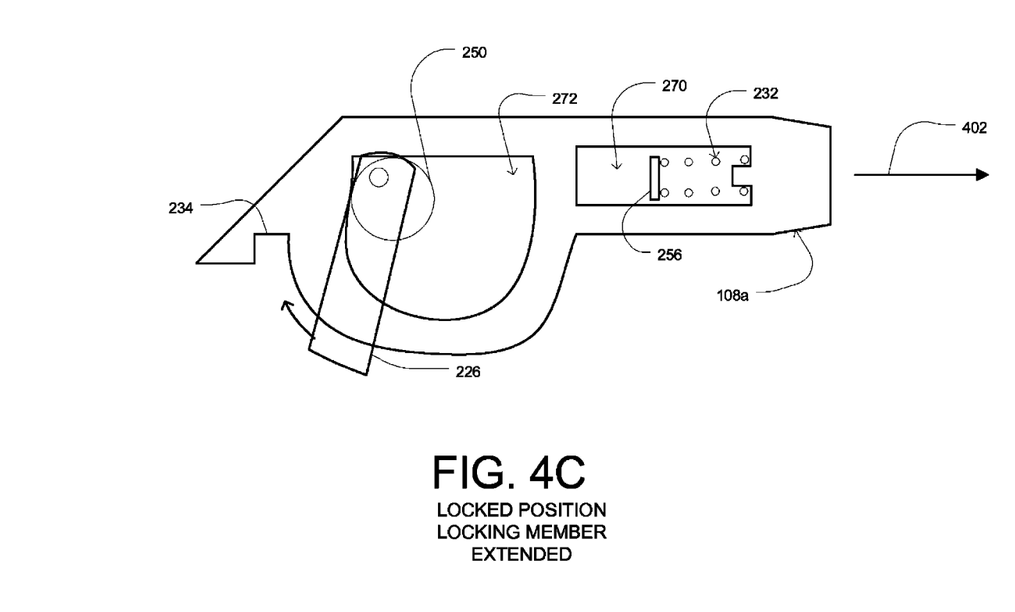
FIG. 4C is a plan view of the locking member and eccentric cam of FIG. 2 in a locked position with the locking member extended.

FIGS. 4A-4C are plan views of the locking member 108a, eccentric cam 250 of the worm wheel 240, and locking arm 226 of the locking lever 210 in unlocked (FIG. 4A), cocked (FIG. 4B), and locked (FIG. 4C) positions to further illustrate operation of the steering shaft lock actuator 102a of FIG. 2. The motor 212 may drive the worm gear 203 which may be meshingly engaged with a portion of the worm wheel 240. As the worm wheel rotates, the eccentric cam 250 may contact a portion of the second opening 272 in the locking member 108a to linearly urge the locking member 108a in the direction indicated by arrow 402 to a retracted or unlocked position of FIG. 4A. The locking arm 226 of the locking lever 210 may also be urged into a locked position within the slot 234. The compression spring 232 may be compressed between the locking member 108a and the tab 256 of the housing 202 when the locking member is urged to its unlocked position. The compression spring 232 may be sufficiently compressed to store enough energy to later drive the locking member 108a toward its locked position.

As shown in FIG. 4B, the motor 212 may drive the worm wheel 240 so that the eccentric cam 250 is rotated counterclockwise creating space 483 for the compression spring 232 to drive the locking member 108a linearly outward in the direction indicated by arrow 403. The locking arm 226 may also be driven to its unlocked position to enable extension of the locking member 108a. However, an obstruction may be encountered by the locking member 108a as its attempts to fully extend. Advantageously, the actuator 102a may maintain the cocked position of FIG. 4B until the obstruction is removed. While in this cocked position, the actuator 102a may be de-energized and hence the motor 212 may also be de-energized. The compression spring 232 may be sufficiently compressed in the position of FIG. 4B with enough stored energy to drive the locking member 108a linearly outward once the obstruction is removed.

FIG. 4C illustrates the locking member 108a fully extended to its locked position by the stored energy of the compression spring 232 once the obstruction encountered in FIG. 4B is removed. Compared to FIG. 4B, the compression spring 232 has driven the locking member 108 to a fully extended position until a portion of the second opening 272 of the locking member 108a contacts the eccentric cam 250. Hence, the size of the eccentric cam 250, the placement of the opening 230 for the shaft 274 in the eccentric cam, the amount of rotation of the worm wheel 240, and the length of the compression spring 232 may control the linear travel distance of the locking member 108a from its unlocked to its fully extended locked position.

The steering shaft lock actuator 102a may also provide positional feedback for at least one element of the actuator 102a. For instance, the position of the eccentric cam 250 of the worm wheel 240 may be monitored. To accomplish this, one or more magnets, e.g., magnet 246, may be coupled directly or indirectly to the worm wheel 240. One or more magnetic sensors may be positioned proximate the rotating worm wheel 240. In one embodiment, the magnetic sensors may be Hall Effect sensors. Hall Effect sensors 242 and 244 may be positioned 180 degrees apart from each other about the shaft 274 on the PCB assembly 250. As the position of the worm wheel 240 and hence the eccentric cam 250 varies, the magnetic field sensed by the Hall Effect sensors 242 and 244 may vary based on proximity of the magnet 246 relative to each of the Hall Effect sensors 242 and 244. Accordingly, the position of the eccentric cam 250 may be ascertained from the magnetic field sensed by the Hall Effect sensors 242 and 244. Hall Effect sensors may provide for reliability and repeatability of positioning sensing over voltage and temperature extremes. In addition to, or in lieu of, magnetic field sensors, a contact type of sensor or switch may be utilized to provide position feedback information on the position of the eccentric cam 250.

In addition to, or in lieu of, sensing the position of the eccentric cam 250, the actuator 102a may sense the position of the locking lever 210 to determine if it is in its locked or unlocked position. A magnet 206 and another Hall Effect sensor may be utilized to determine the position of the locking lever 210. Similarly, a contact type of sensor switch may be utilized to provide position feedback information regarding the position of the locking lever 210.

Figure 5A:
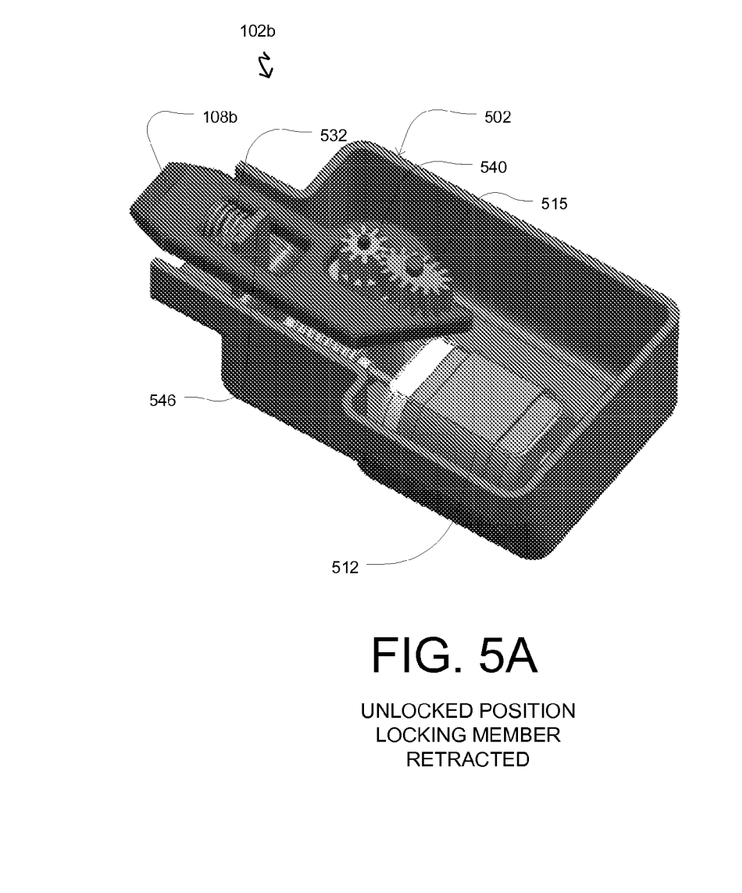
FIG. 5A diagrammatically illustrates a second embodiment of a steering shaft lock actuator consistent with the present invention in an unlocked position with the locking member retracted.
Figure 5B:
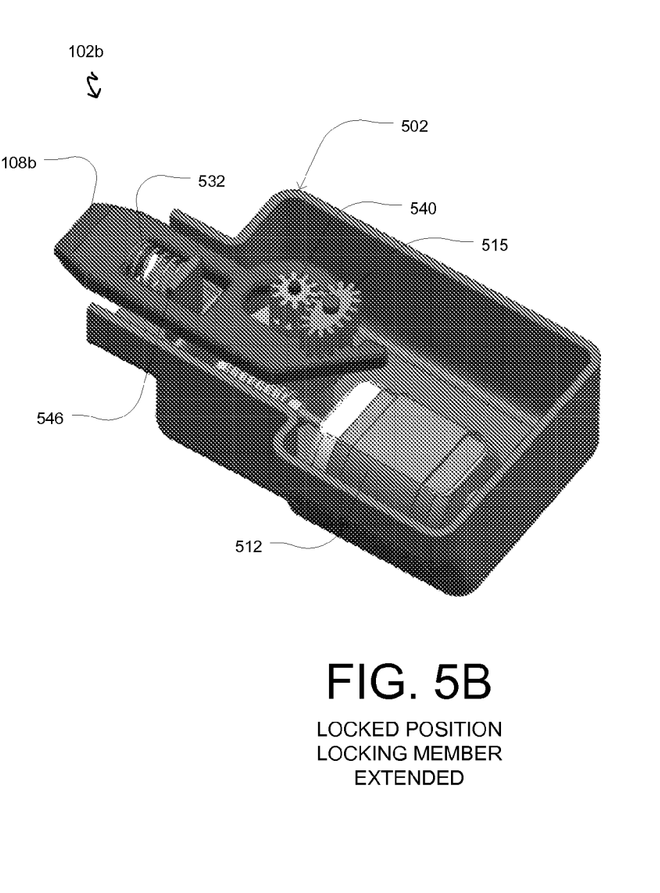
FIG. 5B diagrammatically illustrates the second embodiment of a steering shaft lock actuator consistent with the present invention in a locked position with the locking member extended.

FIGS. 5A and 5B diagrammatically illustrate another exemplary embodiment 102b of a steering shaft lock actuator consistent with the present invention in an unlocked and locked position, respectively. Compared to the steering shaft actuator 102a of the first embodiment, the drive gear of the drive train may include an elliptical spur gear 515 as opposed to the worm wheel 240 with the eccentric cam 250. The drive train may further a spur gear 540 in meshing engagement with the elliptical spur gear 515. The elliptical spur gear arrangement in cooperation with the compression spring 532 may translate rotary motion of the motor 512 to linear output motion of the locking member 108b. Other components and operation of the steering shaft lock actuator 102b may be consistent with the first embodiment of the steering shaft actuator 102a. For example, the steering shaft actuator 102b may also provide positional feedback and a locking lever arrangement.

FIG. 5A diagrammatically illustrates the steering shaft lock actuator 102b in an unlocked position with the locking member 108b retracted. The motor 512 may drive the drive train including the spur gear 540 and the elliptical spur gear 515 so that a portion of the elliptical spur gear 515 contacts the locking member 108b and drives it to the retracted position. The compression spring 532 may therefore be compressed in the unlocked position between the tab 546 and a portion of the locking member 108b. The compression spring 532 may be compressed sufficiently to have enough stored energy to later drive the locking member 108b toward a locked position when permitted by the movement of the elliptical spur gear 515.

FIG. 5B diagrammatically illustrates the steering shaft lock actuator 102b in a locked position with the locking member 108b extended. The motor 512 may drive the gear train including the spur gear 540 and elliptical spur gear 515 so that the elliptical spur gear is rotated from its position in FIG. 5A to its position in FIG. 5B to enable the compression spring 532 to drive locking member 108b toward the locked position. If the locking member 108b encounters an obstruction, the locking member 108b may remain in a cocked position and the actuator may de-energize the motor 512. Once the obstruction is removed, the compression spring 532 may drive the locking member 108b into its locked position.

Figure 6:
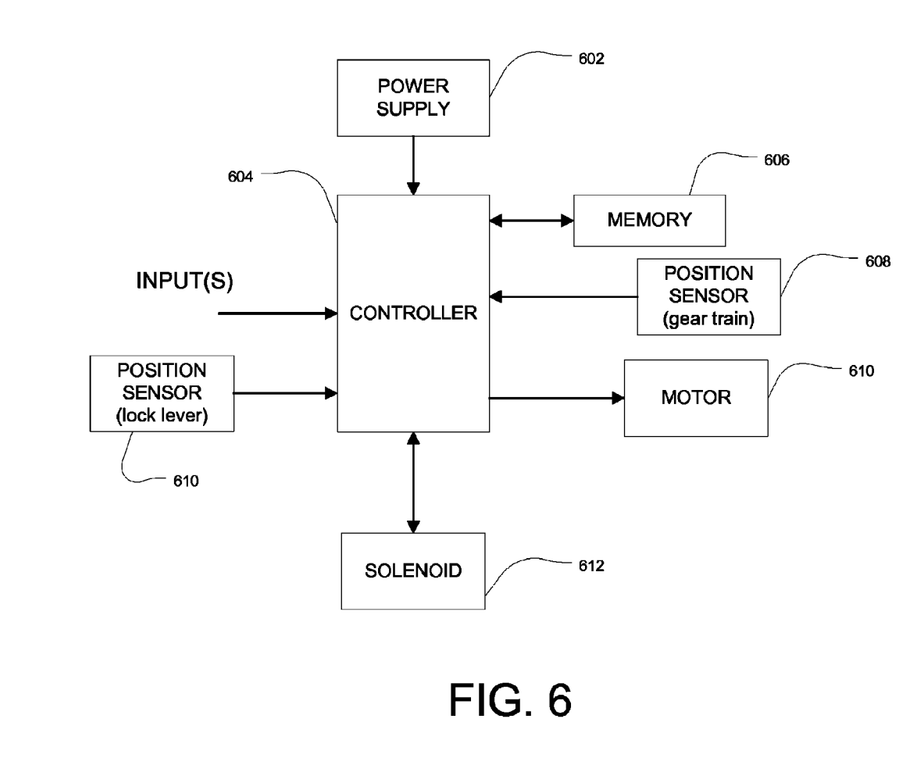
FIG. 6 is an electrical block diagram that may be utilized to control the steering shaft lock actuator of the first and second embodiments.

FIG. 6 is an electrical block diagram 600 that may be utilized to control the steering shaft lock actuator of the first and second embodiments. A controller 604 may accept a variety of input signals and control the motor 612, e.g., motor 212 of the first embodiment or motor 512 of the second embodiment, to thereby control the position of the locking member 108. The controller 604 may also control the solenoid 614, e.g., solenoid 214 of the first embodiment, to thereby control the position of the lock lever 210. In one embodiment, the controller 604 may be a microcontroller.

One or more position sensors 608 may provide a signal to the controller 604 representative of the position of a drive gear of the drive train driven by the motor. For instance, the drive gear may be the worm wheel 240 having the eccentric cam 250 in the first embodiment and the drive gear may be the elliptical spur gear 215 in the second embodiment. Another position sensor 610 may provide a signal to the controller 604 representative of the position of the lock lever 210. The controller 604 may also store and retrieve information from memory 606. A power supply 602 may provide power for the controller 604 and may also provide dedicated I/O lines from discrete vehicle inputs communicated to the actuator via a serial data bus (e.g., a LIN, CAN or J1850 bus). Other inputs may also be provided to the controller 604, e.g., a user command to drive the locking member toward the locked position may also be received by the controller 604.

In response to the various input signals and monitored conditions, the controller 604 may provide a signal to the motor 612 to drive the locking member 108 to an unlocked or retracted position. The motor 612 may accomplish this by driving a drive gear of the drive train coupled to an output shaft of the motor. The drive gear may contact the locking member and urge the locking member to its unlocked position. The controller 604 may also instruct the motor to move the drive gear of the drive train to enable the lost motion device, e.g., the compression spring 232 of the first embodiment or compression spring 532 of the second embodiment, to drive the locking member toward a locked position with a steering shaft.

The steering shaft lock actuator may also drive the locking member toward a locked position upon receipt of a command by a user. The actuator may also include a safety mechanism that may prevent the locking member 108 from engaging unless one or more logic criteria are met in the electronics or software associated with the actuator or embedded in the controller 604.

Consistent with one aspect, the PCB layout and/or circuit design may be designed to minimize and/or mitigate inadvertent or unexpected operation of the actuator, which may, for example, be due to high levels of electro-magnetic noise. The actuator may also be designed to have integral protection for the motor to prevent over heating and/or other failures. An actuator according to the present disclosure may include integrated control circuitry that may eliminate the need for an external controller.

The drive train of an actuator according to the present disclosure may provided in numerous configurations. According to the first embodiment, the gear mechanism may use a worm gear and eccentric cam to translate rotary input from a motor to a linear output motion. According to the second embodiment, a worm gear may be attached to an elliptical spur gear. The elliptical spur gear may translate rotary input motion from the motor/upstream drive train to linear output motion. Other arrangements may be provided, for example including a worm gear with eccentric pin connected to a drive linkage similar in function to that of a steam locomotive, etc.

In summary, there is provided a steering shaft lock actuator. The steering shaft lock actuator may include a motor having an output shaft, a drive train, and a lost motion device. The drive train may be coupled to the output shaft, and may be configured to linearly urge a locking member to an unlocked position upon energization of the motor. The lost motion device may be configured to store energy when the drive gear urges the locking member to the unlocked position and drive the locking member toward a locked position with a steering shaft when the motor is de-energized.

There is also provided a method including urging a locking member of a steering shaft lock actuator in a linear direction to an unlocked position; storing energy in a lost motion device when the locking member is urged to the unlocked position; and utilizing the stored energy to drive the locking member toward a locked position with a steering shaft.

There is also provided a system. The system may include a steering shaft; and a steering shaft lock actuator configured to lock and unlock the steering shaft. The steering shaft lock actuator may include a motor having an output shaft, a drive train, and a lost motion device. The drive train may be coupled to the output shaft, and may be configured to linearly urge a locking member to an unlocked position upon energization of the motor. The lost motion device may be configured to store energy when the drive gear urges the locking member to the unlocked position and drive the locking member toward a locked position with the steering shaft when the motor is de-energized.

Advantageously, the motor of the actuator may be de-energized if an obstruction is encountered by the locking member when it is driven toward a locked position. This protects the motor from such blocked conditions and a lost motion device may have sufficient stored energy to drive the locking member to the locked position once the obstruction is removed. In addition, various safety features such as a locking lever that locks the locking member in its unlocked position further ensure that the locking member may not be inadvertently locked during normal driving conditions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   providing a steering shaft lock actuator comprising:
   a housing;
   a motor disposed in said housing and having an output shaft;
   a drive train disposed in said housing and coupled to said output shaft;
   a locking member coupled to said drive train and having portions defining a first opening and a second opening therein, said locking member being movable between a locked position wherein said locking member prevents rotation of a steering shaft and an unlocked position wherein said locking member does not prevent rotation of the steering shaft; and
   a first compression spring having a first end positioned against said housing and a second end positioned against an edge of said first opening of said locking member,
   wherein said drive train comprises a worm wheel having an eccentric cam disposed in said second opening of said locking member, and
   wherein a locking lever is coupled to said eccentric cam, said lock lever comprising a longitudinal extension and a locking arm and a projection extending from opposing ends of said longitudinal extension, said locking lever being movable between a first position wherein said locking lever prevents movement of said locking member to said locked position and a second position wherein said locking lever does not prevent movement of said locking member to said locked position;
   energizing said motor and linearly driving said locking member through said drive train, said eccentric cam of said drive train contacting said second opening of said locking member and urging said locking member in a linear direction to said unlocked position;
   storing energy in said first compression spring when said locking member is urged to said unlocked position; and
   utilizing said stored energy in said first compression spring to drive said locking member from said unlocked position toward a locked position with said steering shaft.

2. The method of claim 1, wherein said locking member has a cocked position when said locking member encounters an obstruction, said method further comprising de-energizing said motor of said steering shaft lock actuator when said locking member is in said cocked position.

3. The method of claim 2, further comprising urging, by way of said first compression spring, said locking member into said locked position when said obstruction is removed.

4. The method of claim 1, further comprising locking said locking member in said unlocked position by driving said locking lever to said first position to engage a portion of said locking member.

5. The method of claim 4, wherein said steering shaft lock actuator further comprises a solenoid having a plunger and a second compression spring about said plunger, said method further comprising de-energizing said solenoid and urging, by way of said second compression spring, at least a portion of said longitudinal extension of said locking lever into engagement with a slot defined in said locking member.

6. The method of claim 1, further comprising unlocking said locking member from said unlocked position by driving said locking lever to said second position to disengage from a portion of said locking member.

7. The method of claim 6, wherein said steering shaft lock actuator further comprises a solenoid having a plunger and a second compression spring about said plunger, said method further comprising energizing said solenoid and pulling, by way of said plunger, at least a portion of said longitudinal extension of said locking lever out of engagement with a slot defined in said locking member.

* * * * *